Figure 1:
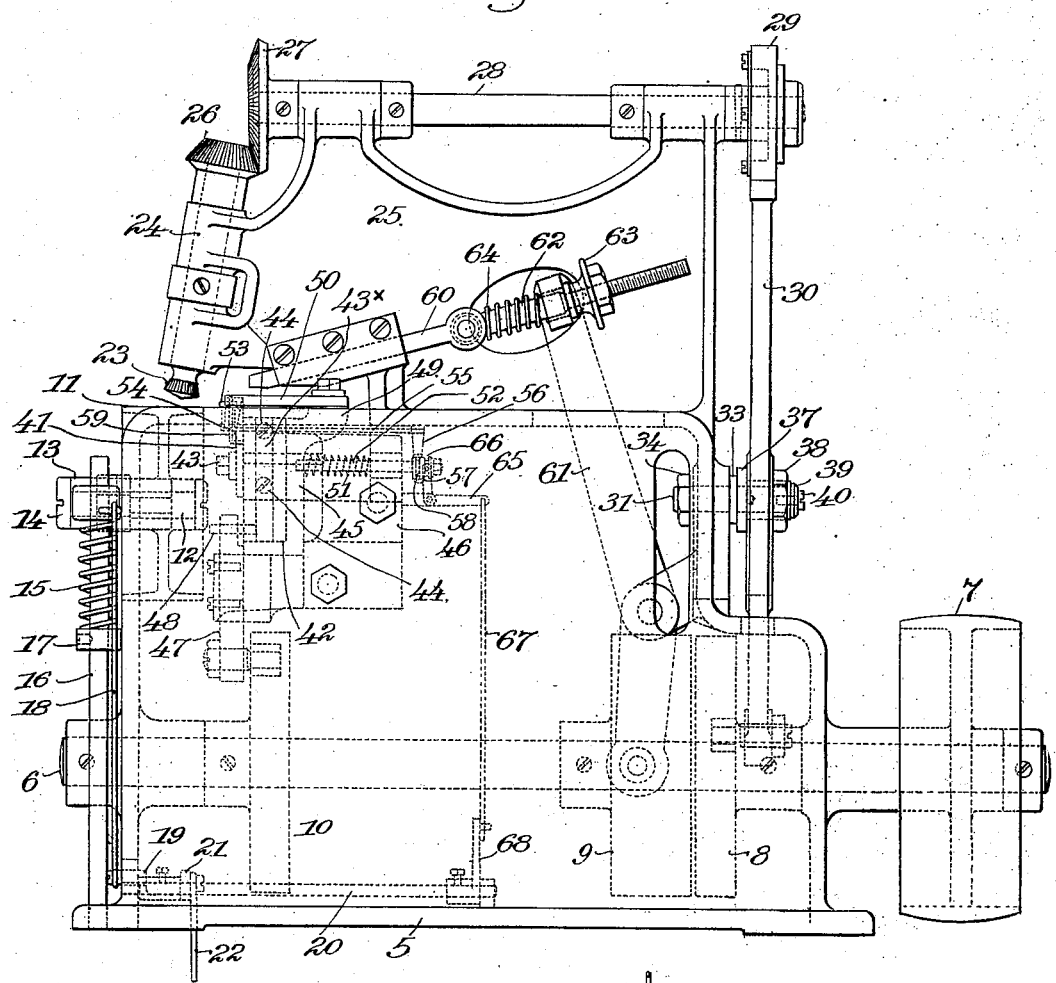

No. 685,373. Patented Oct. 29, 1901.
A. B. FOWLER.
MACHINE FOR MAKING INSOLES.
(Application filed July 24, 1901.)

(No Model.) 4 Sheets—Sheet 1.

Witnesses:
Inventor:

No. 685,373. Patented Oct. 29, 1901.
A. B. FOWLER.
MACHINE FOR MAKING INSOLES.
(Application filed July 24, 1901.)
(No Model.) 4 Sheets—Sheet 2.
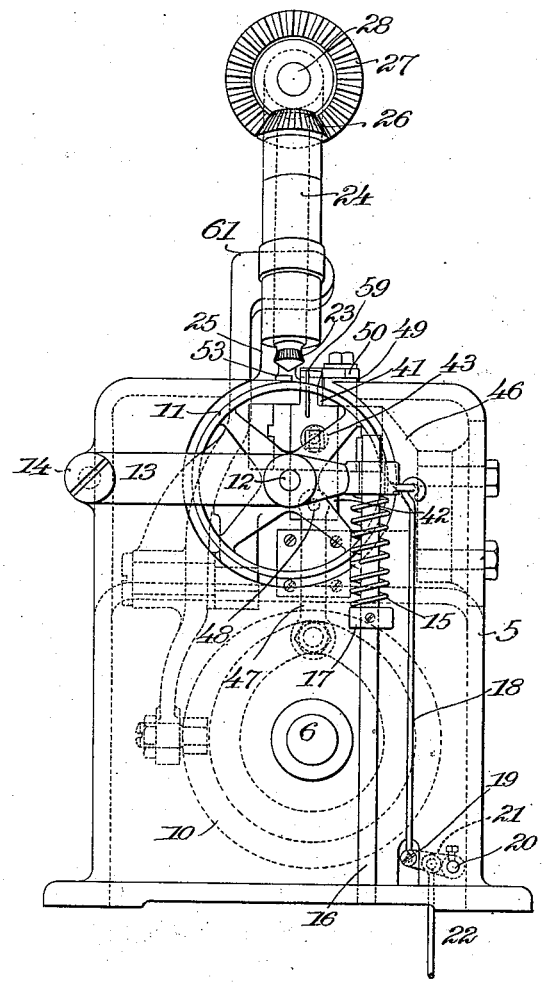
Fig: 2.

No. 685,373. Patented Oct. 29, 1901.
A. B. FOWLER.
MACHINE FOR MAKING INSOLES.
(Application filed July 24, 1901.)
(No Model.) 4 Sheets—Sheet 3.
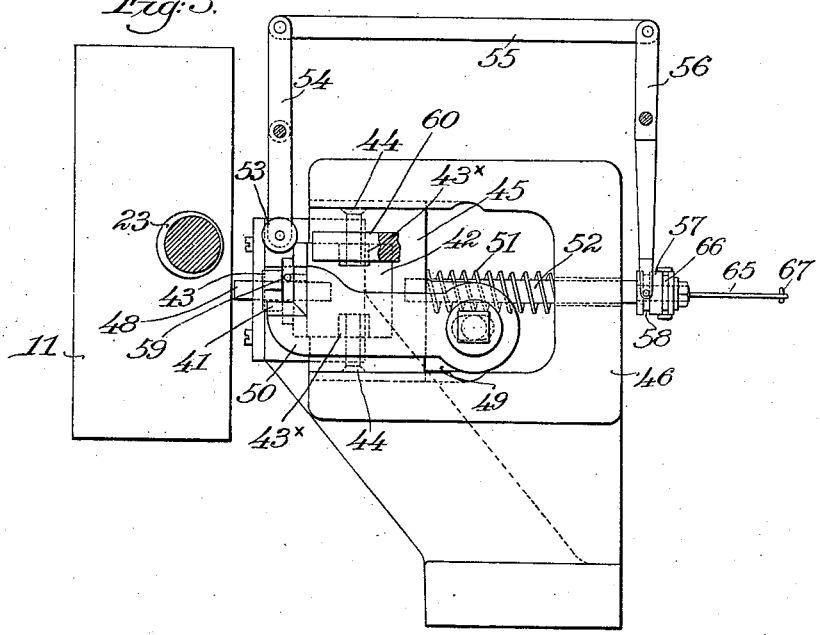
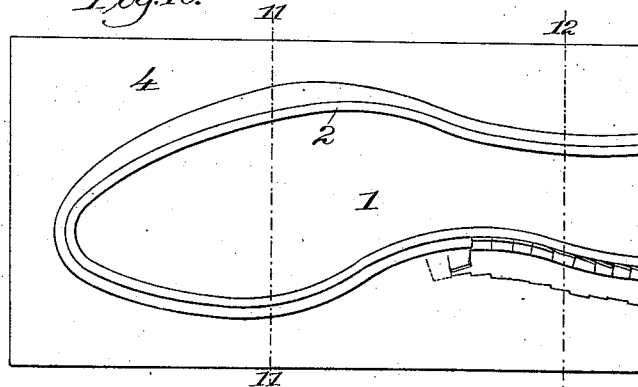
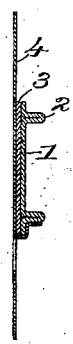
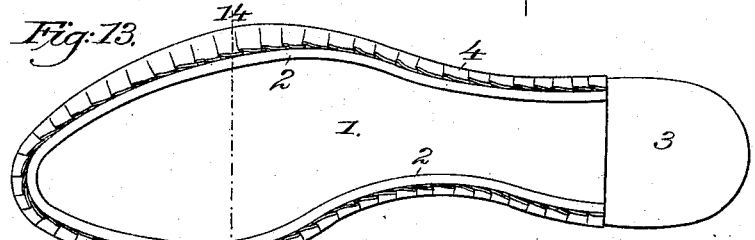
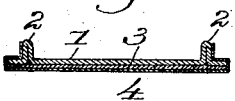
Witnesses: Inventor: Alfred B. Fowler No. 685,373. Patented Oct. 29, 1901.
A. B. FOWLER.
MACHINE FOR MAKING INSOLES.
(Application filed July 24, 1901.)
(No Model.)
4 Sheets—Sheet 4.

Witnesses:
Inventor:

UNITED STATES PATENT OFFICE.

ALFRED B. FOWLER, OF CENTRAL FALLS, RHODE ISLAND, ASSIGNOR TO UNITED SHOE MACHINERY COMPANY, OF PATERSON, NEW JERSEY, A CORPORATION OF NEW JERSEY.

MACHINE FOR MAKING INSOLES.

SPECIFICATION forming part of Letters Patent No. 685,373, dated October 29, 1901.

Application filed July 24, 1901. Serial No. 69,559. (No model.)

*To all whom it may concern:*

Be it known that I, ALFRED B. FOWLER, a citizen of the United States, residing at Central Falls, in the county of Providence and State of Rhode Island, have invented certain new and useful Improvements in Machines for Making Insoles; and I do hereby declare the following to be a full, clear, and exact description of the invention, such as will enable others skilled in the art to which it appertains to make and use the same.

The present invention relates to machines for making insoles.

One type of insole now commonly used in the manufacture of boots and shoes is provided with a rib projecting from the surface of the sole near the edge thereof to receive the stitches of the seam which unites the sole to the upper. This rib is formed in various ways, as by splitting the edge of the sole and turning up a portion thereof at right angles to the surface of the sole, by forming a fold in the sole or in one more of the layers thereof when the sole consists of more than one layer of material, or by forcing up a portion of the material of the sole or one of the layers thereof by a molding process. This rib, however produced, is known as the "lip," and the portion of the sole outside of the rib is known as the "feather," and these terms will be used in this specification in referring to these parts.

Insoles of the type referred to are made of thin flexible material, and in order to strengthen various portions thereof, and especially the lip, are often provided with a layer or strip of reinforcing material, generally canvas, secured to the surface of the sole and to one or both surfaces of the lip. One form of insole which has been extensively used is provided with a layer of reinforcing material secured to the unlipped surface of the sole and folded over the edge of the sole and secured to the outer surface of the lip. So far as I am advised this reinforcing material has heretofore been applied to the sole by hand, and the object of the present invention is to provide a machine for doing this work in a rapid and satisfactory manner.

With this object in view my invention, broadly considered, consists in a machine for making insoles provided with means for folding the projecting edge of the reinforcing material secured to the unlipped surface of the sole over the edge of the sole and pressing it against the lip.

In addition to the means for folding over the projecting edge of the reinforcing material a machine embodying my invention is preferably provided with means for trimming the edge of the reinforcing material and also with means for slitting such edge to cause it to lie smoothly against the surface of the feather and lip, and my invention also consists in a machine for making insoles provided with means for folding the projecting edge of the reinforcing material over the edge of the sole and pressing it against the lip and with either or both of the means above referred to.

In carrying out my invention the means above referred to may be embodied in any suitable or desired form, as my invention is generic in character and is not limited to any particular construction or arrangement of parts.

The machine illustrated in the accompanying drawings, however, embodies my invention in the best form at present known to me and in the construction and arrangement of its various parts involves features of novelty and invention the advantages of which will be apparent to those skilled in the art from the following description.

Figure 9:
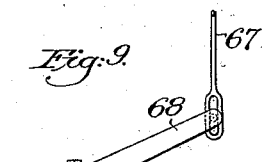
Figure 4:
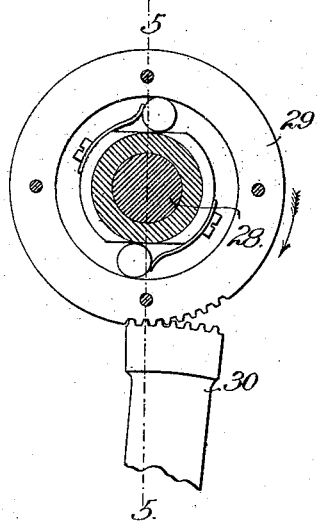
Figure 5:
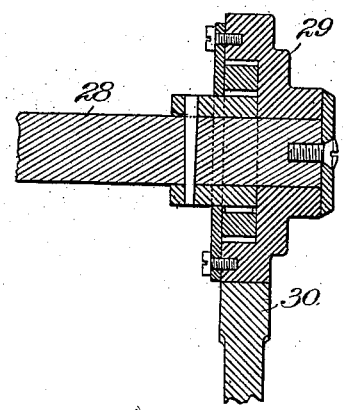
Figure 8:
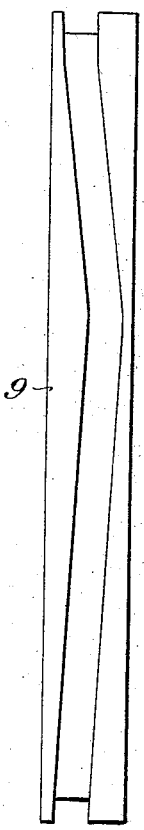
Figure 6:
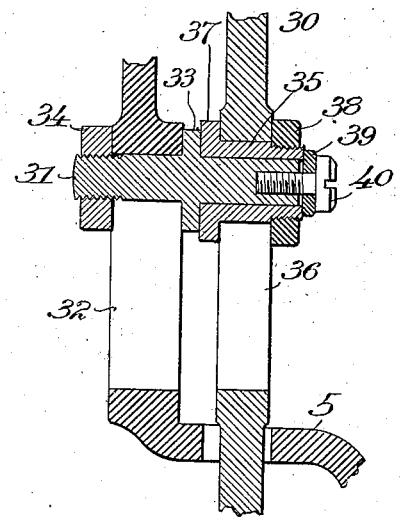
Figure 7:
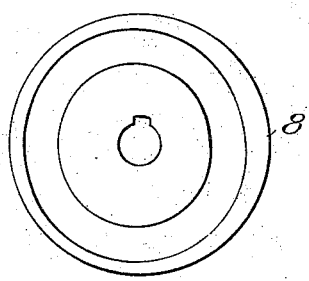

Referring to the drawings, Figure 1 is a view, in side elevation, of a machine for making insoles embodying my invention. Fig. 2 is a view, in front elevation, of the machine shown in Fig. 1. Fig. 3 is a plan view of the work-supporting roll, the trimming devices, the casting for supporting the same, and the mechanism for maintaining the trimming devices at the desired distance from the edge of the sole, the top plate of the machine-frame being removed and the guiding and feeding roll and the reciprocating presser being shown in section. Fig. 4 is a detail view, partly in section, of a portion of the mechanism for intermittently driving the feed-roll. Fig. 5 is a sectional view of the parts shown in Fig. 4, taken on the line 5 5 of said figure. Fig. 6 is a detail sectional view showing the construction by means of which the extent of the feed movements imparted to the feed-roll can be adjusted. Fig. 7 is a face view of the cam from which the feed-roll is actuated. Fig. 8 is a view showing the development of the cam which actuates the reciprocating presser. Fig. 9 is a detail view of a portion of the mechanism by which the position of the trimming devices is controlled by the operator. Fig. 10 is a plan view of an insole during the process of manufacture, illustrating the manner in which the reinforcing material is acted upon by the machine illustrated in the drawings. Figs. 11 and 12 are sectional views taken on lines 11 11 and 12 12 of Fig. 10. Fig. 13 is a plan view of the completed sole for the manufacture of which the machine illustrated in the drawings is especially designed, and Fig. 14 is a sectional view on the line 14 14 of Fig. 13.

The insole illustrated in Figs. 10 to 14 consists of a layer of material 1, preferably of canvas, upon one surface of which is formed a lip 2 in any suitable manner, as by folding the material upon itself or by forcing up the material by a molding process, said lip extending completely around the sole except at the heel portion, at a short distance from the edge of the sole. To the unlipped surface of the layer 1 is secured a layer of material 3, also preferably of canvas, the edge of said layer being flush with the edge of layer 1. To the layer 3 is secured a layer of canvas or other suitable reinforcing material 4. The edge of reinforcing material 4 is trimmed at a distance from the edge of the sole equal to the width of the portion of the sole outside of the lip 2 (hereinafter referred to as the "feather") plus the height of the lip and the thickness of the edge of the sole and is folded over the edge of the sole and pressed against the upper surface of the feather and the outer surface of the lip. In order to avoid puckering or wrinkling the edge of the material so folded over, slits are formed in the edge prior to its folding over, extending inward toward the edge of the sole, whereby the strips into which the edge is separated by the slits are allowed to overlap, as is clearly shown in Fig. 13.

Heretofore the operation of trimming, slitting, and folding over the edge of the reinforcing material 4 has been performed by hand. The machine shown in Figs. 1 to 9 is especially designed to perform these operations automatically in a rapid and satisfactory manner. Referring to said figures, 5 indicates the frame of the machine, in the lower portion of which is journaled a driving-shaft 6, having secured thereto a driving-pulley 7 and cams 8, 9, and 10, from which the various parts of the machine are actuated, as will be described. At the upper front portion of the machine-frame is located a work-supporting roll 11, the periphery of which extends into the plane of the top plate of the machine-frame. Roll 11 is rotatably mounted on a stud 12, secured to an arm 13, pivoted at 14 to the front plate of the machine-frame. The arm 13 is extended on the opposite side of the stud 12 from the pivot 14 and is pressed upward by a coiled spring 15, surrounding a stationary rod 16, which extends through an opening in the end of arm 13, said spring being interposed between the arm and a collar 17, secured to the rod. To the free end of arm 13 the upper end of a rod 18 is connected, the lower end of which is connected to an arm 19, secured to a horizontal rock-shaft 20, journaled in the lower portion of the machine-frame. To the rock-shaft 20 is also secured an arm 21, which is connected, by means of a rod 22, to a treadle. (Not shown.) The roll 11 is normally pressed upward by the action of spring 15 on arm 13, but can be depressed by means of the connections above described when it is desired to place work in the machine. Above the work-supporting roll 11 is located a roll 23, secured to the lower end of a shaft 24, mounted in bearings on the front edge of a vertical web 25, extending upwardly from the top plate of the machine-frame. The shaft 24 is arranged oblique to the peripheral surface of roll 11, and the lower end of roll 23 is conical and the peripheral surface is beveled, so that the roller is adapted to press upon the surface of an insole inside of the lip and to engage the inner surface of the lip. When the roll 11 is raised by the action of the spring 15, a sole supported on the roll will be gripped between the roll and the roll 23 and will be fed forward when the roll 23 is rotated. By engaging the inner surface of the lip the roll 23 will also act as a guide. A further function of the roll 23 is to support the lip against the action of the device which presses the edge of the reinforcing material against the outer surface of the lip, as will hereinafter appear. In the machine shown in the drawings the work is fed forward intermittently, an intermittent rotation being imparted to the feed-roll 23, as follows: To the upper end of shaft 24 is secured a beveled gear 26, meshing with a beveled gear 27, secured to a horizontal shaft 28, journaled in bearings on the upper edge of web 25. On the rear end of shaft 28 is loosely journaled a disk 29, a portion of the periphery of which is provided with gear-teeth. (See more particularly Figs. 4 and 5.) Meshing with these gear-teeth is a segmental gear formed on the upper end of a lever 30, pivoted intermediate its ends on the rear portion of the machine-frame and provided at its lower end with a roll engaging the groove of cam 8. Between the disk 29 and shaft 28 is arranged a one-way clutch device of well-known construction, which is clearly shown in Figs. 4 and 5 and which will be understood without further description.

The above-described construction is such that the lever 30 is oscillated during the revolution of driving-shaft 6 to rotate the disk 29 first in one direction and then in the other, the disk being connected with the shaft 28 when rotating in one direction and being disconnected therefrom when rotating in the other, whereby an intermittent rotary movement is imparted to the shaft 28 in one direction and through the gears 27 and 28 and shaft 24 to roll 23.

In order to adjust the extent of the intermittent movements imparted to roll 23, the pin which forms the pivot of lever 30 is adjustably mounted in the machine-frame and in the lever. This construction is shown in detail in Fig. 6, in which 31 represents the pivot-pin mounted in a vertical slot 32 in the machine-frame. The pin is provided with a flange 33, which bears against one side of the frame, and with a clamping-nut 34, engaging a screw-threaded end of the pin and bearing against the other side of the frame. The pin 31 extends through a block 35, which is held in the slot 36 in the lever 30 by means of a flange 37, which bears against one side of the lever, and a nut 38, engaging a screw-thread on the block and bearing against the other side of the lever. The block 35 is free to turn on the pin 31 and is held from endwise movement thereon by means of the flange 33, which bears against the flange 37, and a washer 39, bearing against the other end of the block 35 and held in position by means of a screw 40 in the end of the pin 31. By loosening the locking-nuts 34 and 38 the pin 31 and block 35 can be adjusted in the slots 32 and 36, and thereafter locked in adjusted position by screwing up the nuts. By so adjusting the pin the throw of the upper end of lever 30 can be increased or diminished to give the desired extent of movement to the feed-roll.

For trimming and slitting the edge of the reinforcing material the machine shown in the drawings is provided with a reciprocating cutter, the cutting edge of which is in the shape of the letter L, the portion of the cutting edge which acts to trim the reinforcing material being of a length somewhat greater than the distance to which the work is moved at each actuation of the feed-roll. Coacting with this reciprocating cutter is a relatively stationary support for the reinforcing material provided with shearing edges to coact with the edge of the cutter. The width of the feather of an insole often varies at different portions of the fore part of the sole. Thus in the insole shown in Figs. 10 and 15 the width of the feather is not uniform throughout, being greatest at the outer edge of the fore part of the sole. In some soles also the feather is wider at the shank portion of the sole than at one or both edges of the fore part, and in order that the reinforcing material when pressed against the outer surface of the lip may extend to a uniform height it is necessary that the reinforcing material be trimmed at varying distances from the edge of the sole, said distance preferably being equal to the width of the feather plus the height of the lip and the thickness of the edge of the sole. In the machine shown in the drawings the sole is guided by the feed-roll 23, which engages the inner surface of the lip, and in order to cause the reinforcing material to be trimmed at the proper distance from the edge of the sole the cutter and supporting-plate above referred to are mounted to move toward and from the edge of the sole and means are provided for so moving the cutter and support when the width of the feather varies.

The cutter with the L-shaped cutting edge is indicated at 41 and is secured so as to be capable of vertical adjustment to a block 42 by means of a screw 43 passing through a slot in the cutter. The block 42 (shown best in Fig. 2) is provided with vertical slots on two opposite sides which are engaged by guiding-blocks 43, secured by screws 44 to a block 45, the arrangement being such that the block 42, carrying the knife 41, is free to reciprocate vertically in the block 45. The block 45 is mounted to slide horizontally in suitable guideways formed in a casting 46, secured to the frame of the machine, as indicated in Fig. 1. Also mounted in the casting 46, as is clearly shown in dotted lines in Fig. 1, is a vertically-reciprocating slide 47, the lower end of which is provided with a roll engaging the groove of cam 10. A pin 48, projecting from the lower portion of block 42, passes through a hole in the upper end of slide 47, the construction being such that the reciprocations of slide 47 are imparted to the block 42 and cutter 41, carried thereby, and the block 42 is allowed to move horizontally with block 45 without disengaging the pin 48 from slide 47. An arm 49 extends rearwardly and upwardly from the block 45, and secured to this arm is a plate 50, the under surface of which is a sufficient distance above the top plate of the machine to allow the reinforcing material to pass thereunder. This plate extends toward the front of the machine and is provided with an L-shaped notch, the edges of which coact with the cutter 41 in trimming and slitting the reinforcing material. The block 45 is pressed upon by a coiled spring 51, surrounding a rod 52, projecting from the block 45 through the casting 46, the spring being interposed between the casting and the block and tending to move the block toward the front of the machine. To move the block 45 toward the rear of the machine against the tension of spring 51, and thereby maintain the trimming and slitting devices at the proper distance from the edge of the sole, a roller 53, rotatably mounted on the free end of a lever 54, pivoted beneath the top plate of the machine-frame, is provided, the roller being arranged to bear upon the edge of a sole placed in the machine. The other end of lever 54 is connected by link 55 to one end of a lever 56, also pivoted beneath the top plate of the machine-frame. The other end of lever 56 is forked to straddle a collar 57, secured to the rear end of rod 52, and the fork is provided with pins which engage a groove 58 in the collar 57.

When an insole is in the machine, it is fed forward by the feed-roll 23 and guided by the engagement of the feed-roll with the inner surface of the lip. The roll 53 bears against the edge of the sole, and as the width of the feather varies the roll is moved toward and from the roll 23, and through the levers 54, 55, and 56 imparts a corresponding movement to the block 45 and the trimming devices mounted thereon. It will be noted that the arms of lever 54 are of equal length and that the arms of lever 56 are in the ratio of two to one. By this construction the extent of movement imparted to the trimming devices is twice that imparted to the roll 53, and the trimming devices are maintained at the proper distance from the edge of the sole, this distance in the machine shown being equal to the width of the feather plus the height of the lip and the thickness of the edge of the sole.

At each actuation of the cutter 41 an L-shaped incision is made in the reinforcing material, and thereby a strip formed at the edge of the sole, as is indicated in Fig. 10. This strip is thereafter folded over the edge of the sole and pressed against the outer surface of the lip. In the machine shown in the drawings a portion of this folding means consists of a vertically-extending finger 59, secured to the cutter 41 and extending into a position to engage and raise the strip formed by the knife. After the strip is so raised the sole is fed forward by the feeding-roll, and the strip is still further raised by the engagement therewith of the roll 53. For completing the folding over of the strip and for pressing it against the outer surface of the lip a reciprocating presser 60 is provided, mounted to slide in suitable guides secured to or formed in the web 25. The presser 60 reciprocates in a direction substantially at right angles to the line of feed and oblique to the surface of the sole, and its front end is shaped to engage the upwardly-projecting strip of reinforcing material and press it firmly against the surface of the feather and the outer surface of the lip of the sole. The presser is reciprocated from the cam 9 by means of a lever 61, the lower end of which is provided with a roll engaging a groove in the cam 9 and the upper end of which is provided with a lateral offset extending through an opening in the web 25 into a position to be connected with a rod 62, pivoted to the rear end of presser 60. The rod 62 extends loosely through the offset of lever 61 and is provided at its outer end with a screw-thread with which an adjusting-nut 63 has a screw-threaded engagement. A coiled spring 64, surrounding the rod 62 and interposed between the end of presser 60 and the offset of the arm 61, serves to press the offset against the adjusting-nut 63. This construction affords a yielding connection between the presser and its actuating-lever, so that the action of the presser is yielding and the reinforcing material is firmly pressed against the surfaces of the lip and feather without subjecting the work to harsh treatment or liability of injuring the machine.

When it is desired to place work in the machine, the work-supporting roll 11 is depressed by means of the foot-treadle, to which rod 22 is connected, as has been described. Simultaneously with the depression of the roll 11 the block 45 and the trimming devices carried thereby are moved toward the rear of the machine by means of a bell-crank lever 65, pivoted to the rear of the casting 46, one arm of which lever is forked and provided with pins engaging the groove 66 in the block 57, secured to the rear end of rod 52, and the other arm of which is connected, by means of a rod 67, to an arm 68, secured to the rock-shaft 20. The connection between rod 67 and the arm 68 consists of a pin on the arm which extends through a slot in the lower end of the rod, whereby the rod is allowed a vertical movement independent of the arm when the block 45 and the trimming devices carried thereby are moved toward and from the edge of the sole during the operation of the machine.

The operation of the machine above described is as follows: An insole, with the reinforcing material secured to its unlipped surface, as shown in Fig. 10, having been placed in the machine, as above described, and the machine having been thrown into operation, at each revolution of the driving-shaft 6 the knife 41 is raised to make an L-shaped incision in the reinforcing material and the strip formed thereby is raised by the engagement therewith of the finger 59. After the strip has been cut the presser 60 is moved forward and engages the strip in advance of the strip which has just been formed and presses it against the surfaces of the feather and lip. The knife 41 and presser 60 are then retracted and feeding-roll 23 actuated to feed the work. During this feeding movement the strip which was last formed is engaged by the roll 53 and raised into a position to be engaged by the presser 60 in its next forward movement. This cycle of operations is repeated until the insole is finished. As the sole is fed forward and guided by the roll 23 the trimming devices are maintained at the proper distance from the edge of the sole by the engagement of roll 53 with the edge of the sole, as has been described. The slits formed in the edge of the reinforcing material do not extend quite to the edge of the sole, and consequently the action of the presser 60 in folding a strip over the edge of the sole tends to raise the next adjacent strip, which has been previously formed by the cutter, and this action alone may be relied upon for raising the strip.

Having thus indicated the nature and scope of my invention and having specifically described the preferred embodiment thereof, I claim as new and desire to secure by Letters Patent of the United States—

1. A machine for making insoles, having, in combination, means for folding the projecting edge of the reinforcing material over the edge of the sole and pressing it against the lip, substantially as described.

2. A machine for making insoles, having, in combination, means for trimming the projecting edge of the reinforcing material, and means for folding said edge over the edge of the sole and pressing it against the lip, substantially as described.

3. A machine for making insoles, having, in combination, means for slitting the projecting edge of the reinforcing material and means for folding said edge over the edge of the sole and pressing it against the lip, substantially as described.

4. A machine for making insoles, having, in combination, means for trimming and slitting the projecting edge of the reinforcing material and means for folding said edge over the edge of the sole and pressing it against the lip, substantially as described.

5. A machine for making insoles, having, in combination, a guide for the lip of the sole, trimming devices for trimming the projecting edge of the reinforcing material movable toward and from the guide, and means coacting with the edge of the sole for maintaining the trimming devices at a distance from the edge of the sole varying with the width of the feather, substantially as described.

6. A machine for making insoles, having, in combination, means for guiding the sole, trimming devices arranged to trim the projecting edge of the reinforcing material at a distance from the edge of the sole varying with the width of the feather and means for folding said projecting edge over the edge of the sole and pressing it against the lip, substantially as described.

7. A machine for making insoles, having, in combination, means for trimming and slitting the projecting edge of the reinforcing material, a reciprocating presser, means for actuating the same to engage a strip of the reinforcing material and press it against the surfaces of the lip and feather, and means for intermittently feeding the work, substantially as described.

8. A machine for making insoles, having, in combination, trimming and slitting devices for trimming and slitting the projecting edge of the reinforcing material, a reciprocating presser, means for actuating the same to engage a strip in advance of one previously formed by the trimming and slitting devices and press it against the surfaces of the lip and feather and means for intermittently feeding the work, substantially as described.

In testimony whereof I affix my signature in presence of two witnesses.

ALFRED B. FOWLER.

Witnesses:
 ALFRED H. HILDRETH,
 FRED O. FISH.